Patented Jan. 2, 1923.

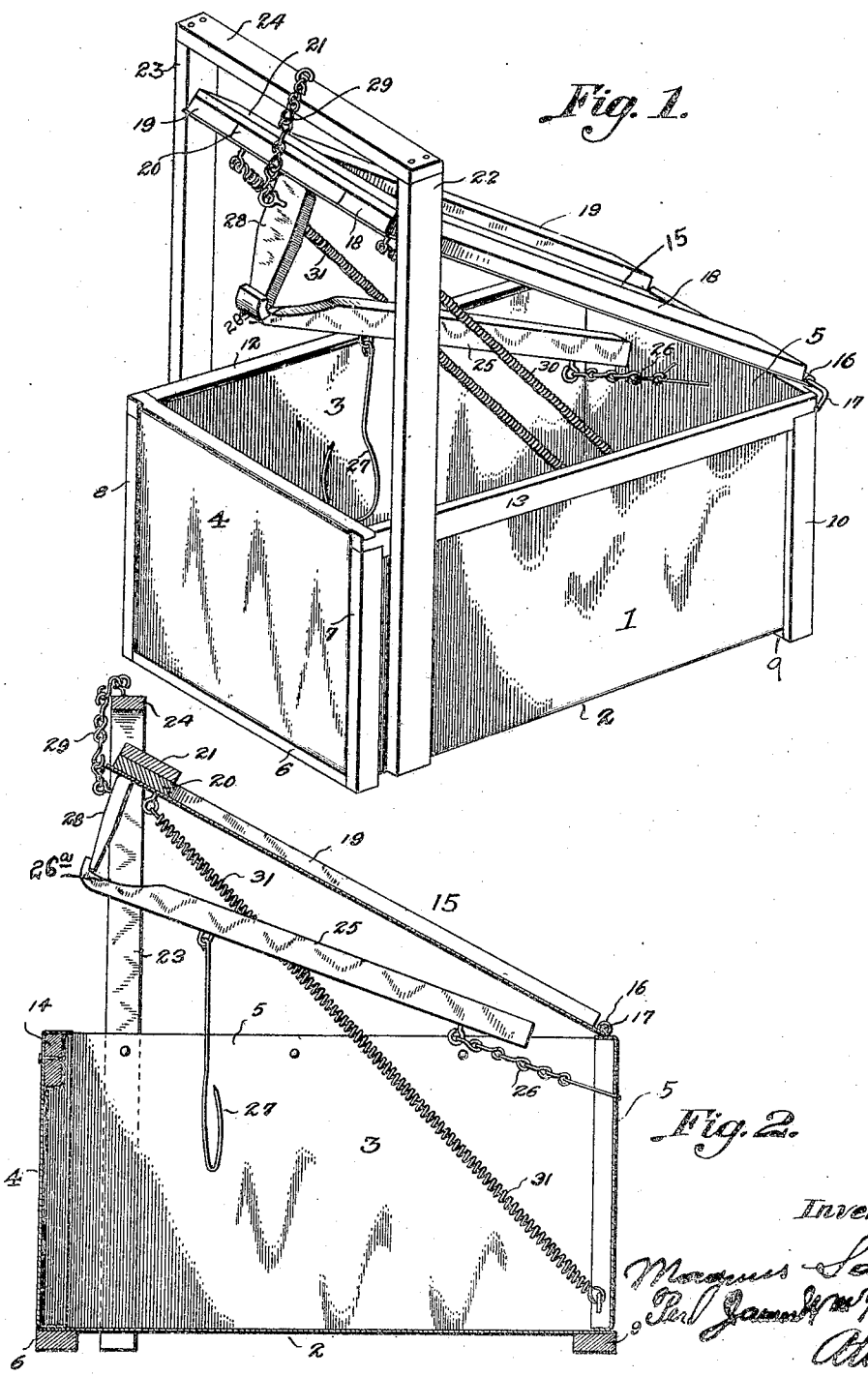

1,441,118

UNITED STATES PATENT OFFICE.

MAGNUS SACKS, OF BROOKLYN, NEW YORK.

TRAP.

Application filed August 25, 1922. Serial No. 584,215.

*To all whom it may concern:*

Be it known that I, MAGNUS SACKS, a citizen of the United States, residing at 202 Hart Street, in the borough of Brooklyn, county of Kings, city and State of New York, have invented a Trap, which relates to a new and improvised device which may be termed or entitled generally as an animal trap, particularly for entrapping animals of the rodent type, such as rats, mice, and of like character.

My invention has for its object, among other things, the insurance of the entrapping of the animal in a simple, effective and inexpensive way, and whereby the entrapped or imprisoned animal is secured against possible escape after capture, whereby the entrapping of the animal is audibly indicated by the impact between the closure and the trap-box, when the closure is sprung in the attempt of the animal to secure the bait.

Other objects of my invention together with those above referred to, will be apparent from the following disclosure or specification and accompanying illustration:—

My invention consists, therefore, of certain instrumentalities and features of construction substantially as hereinafter more fully set forth and defined by the appended claim.

In the accompanying drawing is illustrated the preferred embodiment of my invention or one form thereof, wherein it will be understood that various changes and modifications as relate to the detailed construction and arrangement of parts may be made without departing from the spirit or scope of my invention as covered by the claim, and in which drawing:—

Figure 1 is a perspective view of my invention,

Figure 2 is a vertical, longitudinal, central section of the same.

As characteristic features of my invention, I employ a suitable receptacle or box for the reception of the entrapped animal as will be appreciated later on. This receptacle or box is comprised of sides 1 and 3, a bottom 2 and ends 4 and 5, all of which may be made of metal, the bars 4 and 5 being preferably flanged at their ends and sides, as an expediency for strengthening or reinforcing the same. It also consists of four corner bars or uprights, three of which, 7, 8 and 10 are shown; and longitudinal bars 12 and 13, and a forward or top cross bar 14, and bottom forward and rear end cross bars 6 and 9, all of which are preferably of wood. These are suitably joined or carpentered together preferably as shown, or in any other well known way, the metal members as the sides 1 and 3, bottom 2 and ends 4 and 5 being suitably fastened by nailing or otherwise to the adjacent parts, as will be readily understood.

A suitable closure 15, preferably constituted of a metal plate member, suitably secured to longitudinal wooden members 18 and 19, is hinged or pivoted at its rear end to the upper rear edge of the trap enclosure or box, the hinging or pivoting elements for this purpose being preferably constituted of a bail-like pintle 17, passed or inserted through the tubular portions 16, these tubular portions receiving said pintle 17 being preferably formed from the metal members of the closure 15, and metal member of end 5, or otherwise constructed. The closure 15 is preferably thickened or re-inforced by securing upon the forward or "pounding" end thereof, transverse bars or pieces 20, 21, in order to compensate for and absorb the concussion or shock resultant from the force or impact between the closure and the trap-box when the trap is sprung by the animal in attempting to reach and secure the bait. The closure 15 is forcibly held closed down upon the trap box by strong helical springs 30, 31 or other resilient means suitably connected by staples or screw-eyes, or otherwise, to distant points on the closure 15 and the trap-box end 5. A bar 25, freely or loosely chained as at 26 to the trap box, carries or has freely suspended therefrom, a bait suspending hook 27, the opposite end portion of the bar 25 being notched or grooved or adapted as at 26ª for an engagement therewith of a trigger 28, freely or loosely chained as at 29, to the cross bar 24 of a framework 22, 23 and 24, suitably secured or supported upon the trap box, whereby, upon the animal engaging or pulling upon the bait or bait suspending hook 27, the trigger 28 will be disengaged from the bar 25 which, of course, will allow the springs 30 and 31 to forcibly spring the closure 15 to closed position and accordingly imprison the entrapped animal, as is appreciated.

I claim:—

An animal trap comprising a trap-chamber, a closure for said trap-chamber, pivoted to the rear edge thereof, a resilient connection between said trap-chamber and said closure, adapted to cause the closure to forcibly engage the top edge of said trap-chamber as the closure is sprung to closed position, a bait-suspending member, means for carrying said bait-suspending member, said bait-suspending-member-carrying-means being connected to and arranged within said trap-chamber, a trigger freely disengageable from and held by said closure and adapted to engage said bait-suspending-carrying means, and an upright guide member for said closure fixed to the forward end of said trap-chamber, means for freely or loosely suspending said trigger from said closure guide-member.

MAGNUS SACKS.